June 6, 1967 F. W. JENKINSON 3,324,311
COUNTER AND METHOD
Filed Sept. 12, 1963
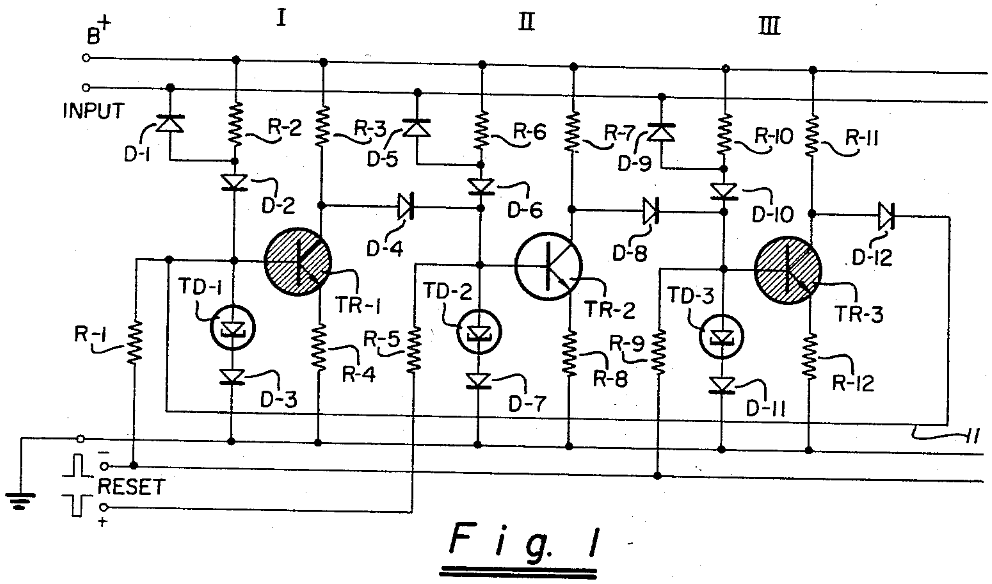
Fig. 1
| CONDITION | IN | COUNT | I | II | III | CODE |
|---|---|---|---|---|---|---|
| A | − | 1 | 1 | 0 | 1 | C |
| B | + | 1 | 0 | 0 | 1 | D |
| A | − | 2 | 0 | 1 | 1 | C |
| B | + | 2 | 0 | 1 | 0 | D |
| A | − | 3 | 1 | 1 | 0 | C |
| B | + | 3 | 1 | 0 | 0 | D |
Fig. 2
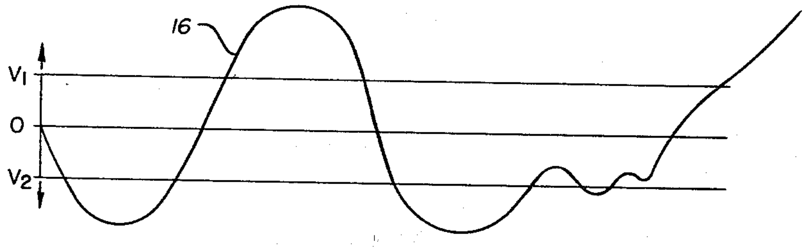
Fig. 3
INVENTOR.
Frederic W. Jenkinson
BY
Attorneys 3,324,311
COUNTER AND METHOD Frederic W. Jenkinson, Lafayette, Calif., assignor to Systron-Donner Corporation, Concord, Calif., a corporation of California Filed Sept. 12, 1963, Ser. No. 308,459
6 Claims. (Cl. 307—88.5)

This invention relates to a counter and method and more particularly to a counter and method useful for very rapid counting.

Many types of logic have been used in counters but the counting or scaling rate of such counters is restricted by the pulse shaping circuitry which supplies pulses to the counter. Under normal circumstances, the information to be counted is amplified and then shaped by a regenerative circuit. It is then differentiated or in some manner made into a pulse of definite time duration in order to obtain proper operation of the counter. If these input pulses are not properly shaped, then the counter may possibly make an extra count or may skip a count. For example, if the input pulses are too long, the gating circuitry may set up before the last input pulse has been completed so that an additional count is registered for the same input pulse. Thus, in conventional counters, there is a critical requirement that the input pulse being counted must be completed before the gating in the counter is set up for the next pulse. At low frequencies, ther is no difficulty in obtaining pulses which will satisfactorily operate the counter. However, for very high speed scaling as, for example, in the 100 megacycle range, the proper shaping of the pulses becomes more critical and more difficult to obtain. In view of these diffiiculties, there is a need for a new and improved counter and method for very rapid scaling.

In general, it is an object of the present invention to provide a counter and method which is particularly adapted for use in high speed scaling or counting.

Another object of the invention is to provide a counter and method of the above character which is insensitive to pulse duration.

Another object of the invention is to provide a counter and method of the above character in which an input event or pulse does not have to end before the gating circuitry sets up for the next input event.

Another object of the invention is to provide a counter and method of the above character which requires a relatively small number of components.

A still further object of the invention is to provide a counter of the above character which is relatively economical and easy to manufacture.

Additional objects and features of the invention will appear from the following description in which the preferred embodiment is set forth in detail in conjunction with the accompanying drawings.

Referring to the drawings:

FIGURE 1 is a ring-of-three counter incorporating my invention and utilizing my method of counting;

FIGURE 2 is a logic table for the counter shown in FIGURE 1; and

FIGURE 3 is a diagram of a typical input waveform.

In general, my counter for counting input events in which the input events are represented by two separate conditions identified as A and B consists of means capable of assuming a plurality of stable states corresponding to a plurality of sequential codes in which the alternate codes are designated as C codes and the remaining codes are designated as D codes. Gating means is provided for connecting the input events so that on going from an A condition to a B condition, the means capable of assuming a plurality of stable states changes from a C code to a D code, and on going from a B condition to an A condition, the means capable of assuming a plurality of stable states changes from a D code to a C code.

As shown in FIGURE 1, the means capable of assuming a plurality of stable states consists of a ring-of-three counter comprised of three serially connected stages, stages I, II and III, each stage being bistable. As shown in FIGURE 2, the means capable of assuming a plurality of stable states, i.e., the ring-of-three counter, passes through a series of six sequential codes as set forth in FIGURE 2. Thus, there are two codes for the number 1; two codes for the number 2; and two codes for the number 3. Alternate codes in the sequential series of codes are identified as C codes as shown in FIGURE 2, whereas the remaining codes are designated as D codes.

The input signal supplied to the device shown in FIGURE 1 must be one in which the input events are represented by two different conditions which can be designated as A and B conditions. These two different conditions can be of many different types, for example, they can be a light shining on a photosensitive transistor or no light shining on the photosensitive transistor. It can be a red light on a photosensitive transistor as opposed to a green light. The conditions can also be negative and positive signals or pulses. Thus, the A condition can be a positive pulse; the B condition, a negative pulse. The A condition can be a positive pulse on one line; the B condition, a positive pulse on another line; and the A condition can be of one polarity and the B condition of a different polarity with one being positive at a certain voltage and the other being negative at a different voltage. The primary factor is to choose conditions which cannot exist simultaneously so that timing problems are eliminated as hereinafter described. Thus, with the embodiment shown in FIGURE 1, a voltage is used such as that shown in FIGURE 3 in which the events are represented by changes in the signal level above and below first and second predetermined levels to provide positive and negative conditions as set forth in FIGURE 2 and which are identified by the letters A and B as also shown in FIGURE 2. Gate means is provided and connects the input events to the stages so that on going from an A condition to a B condition, the means capable of assuming a plurality of stable states changes from a C code to a D code, and when going from a B condition to an A condition, changes from a D code to a C code, as shown in FIGURE 2.

Basically, each stage of the ring-of-three counter consists of a transistor, a tunnel diode and a gate. The transistors for the three stages are designated as TR1, TR2 and TR3 and similarly the tunnel diodes are designated as TD1, TD2 and TD3, and the gates are designated as D4, D8 and D12. Other elements of the circuitry are hereinafter described.

The tunnel diode forms a basic part of the circuit. The tunnel diode with its associated resistors provides a bistable circuit. The tunnel diode TD1 with the resistors R2 and R11 is bistable with operating points in either of two regions of the I–V characteristic curve.

Let it be assumed that the circuitry is in the condition shown in FIGURE 1, that is, in a zero condition or D code, with the transistors TR1 and TR3 in an "on" position and TR2 in an "off" condition. When this is the case, there is a current flow through diode D2. There is no current flow through the gate diode D12 because the transistor TR3 is on.

Now let it be assumed that the input line goes negative, i.e. from a B condition, to an A condition, as indicated by the input signal 16 shown in FIGURE 3. This negative input voltage is applied to the diode D1 which applies a bias to diode D2. As soon as the input signal is more negative than a predetermined voltage V2 (the biasing voltage developed across diode D2), current which was passing through gate diode D2 passes through the diode D1. When this occurs, there is no current flowing throngh the tunnel diode TD1 so that the tunnel diode assumes its first stable state, i.e., a low voltage condition. As soon as TD1 assumes its low voltage condition, the transistor TR1 turns off and permits current to flow through resistor R3 and the gating diode D4. The size of resistor R3 is chosen so that an intermediate value of current is supplied to the tunnel diode TD2 and the biasing diode D7. However, this current flow through the tunnel diode TD2 is insufficient to cause it to turn on or to assume its second stable state, i.e., a forward voltage condition. This intermediate condition can be any suitable current flow such as $\frac{6}{10}$ of $I_p$ where $I_p$ is the current at the peak. The transistor TR1 serves as a phase-inverting means and also serves as an amplifier to provide a large voltage ouptut swing from the tunnel diode. By the shift of the input events from B to A condition, the ring-of-three counter changes from a D code to a C code. Nothing will happen to cause the counting circuit to register a count until a signal more positive than V1 is received on the input line regardless of the length of the negative input event or signal.

Now let it be assumed that the input voltage on the input line goes positive beyond the predetermined positive voltage V1 (the biasing voltage developed across D6) to shift from an A condition to a B condition. The diode D5 reverse biases and current begins to flow through diode D6 and through the tunnel diode TD2 and the biasing diode D7. The combining of current flows from the diodes D4 and D6 through the tunnel diode TD2 more than exceeds $I_p$ for the tunnel diode and causes it to assume its second stable state or in other words, the forward voltage condition. This causes the transistor TR2 to be turned on. Turning of the transistor TR2 on stops current flow through the gate diode D8 to stop part of the current flow through the tunnel diode TD3. However, since current is still flowing through the diode D10, the tunnel diode TD3 does not change its stable state. Thus, the ring-of-three counter shifts from a C code to a D code.

Now let it be assumed that the signal on the input line again swings negative below the predetermined negative voltage V2 to again go from an A condition to a B condition so that the current flowing through resistor R10 flows through the diode D9 to thereby cause all current flow to cease through the tunnel diode TD3 and to thereby cause the tunnel diode TD3 to assume its first stable state, i.e., a low voltage condition. This starts current flow through the diode D12 and through the tunnel diode TD1 by turning transistor TR3 off. However, as pointed out previously, this current flow is insufficient to cause the tunnel diode TD1 to switch from its first stable state. It is only when the input voltage goes sufficiently positive to reverse bias the diode D1 to again permit the current to flow through the diode D2 and through the tunnel diode TD1 that the combined currents flowing through the tunnel diode TD1 then exceed the $I_p$ to cause the tunnel diode to assume its second stable state or a forward voltage condition. This causes the transistor TR1 to be turned on and stops current flow through the diode D4. When input signal goes negative below V2, the current flow through the tunnel diode TD2 will cease and it will assume its first stable state to cause the transistor TR2 to be turned off to thereby place all the circuit elements in the conditions assumed when the description of the operation was commenced.

In the logic table shown in FIGURE 2 and from the mode of operation hereinbefore described, it can be seen that the counting circuit in FIGURE 1 counts in half cycles, that is, two half cycles must be completed to complete a single count.

The resistors R2, R6 and R10 provide the proper high impedance for the tunnel diodes from the B+ source indicated. In addition, these resistors serve to provide a predetermined amount of current flow through the tunnel diode which is substantially below $I_p$ as hereinbefore described. The resistors R3, R7 and R11 also provide a predetermined amount of current flow which is also substantially below the $I_p$ current. If TD1 is in its first stable state, i.e., low voltage condition, hte tunnel diode can only change to the forward voltage condition if the combined currents from R2 and R11 flow through TD1. If the currents from R2 and R11 are both removed, TD1 will assume the first stable state or low voltage condition. The same conditions exist for R6 and R3 currents through TD2, and R10 and R7 currents through TD3. Resetting of the counter is accomplished by applying positive and negative reset pulses to the reset lines and through resistors R1, R5 and R9.

The diodes D1, D5 and D9 are isolating diodes, whereas diodes D2, D6 and D10 are gating diodes as are diodes D4, D8 and D12. Diodes D3, D7 and D11 are biasing diodes.

For each of the logic sections indicated as I, II and III, there are three signals. One is the gate-in signal which can be considered to be the signal supplied from the transistor of the logic unit of the preceding stage. Another is the signal supplied from the input line and the last is the output signal from the transistor of the stage.

From the foregoing description, it can be seen that the tunnel diodes can either be supplied with no currents, one current or two currents and that if the tunnel diode is in its first stable state, i.e., low voltage condition, it will only assume a second stable state or a forward voltage condition when two currents are supplied to the tunnel diode and once it is in its second stable state, it will not assume its first stable state unless both currents are removed from the tunnel diode. Thus, it can be seen that the tunnel diode with its associated resistors has an inherent voltage discrimination characteristic.

From the logic table, it can be seen that with the ring-of-three counters shown in FIGURE 1, either two of the bistable elements or stages are "on" or one of the bistable elements or stages are "on." When one of the bistable elements or stages is in an "on" state, and the input signal goes in an opposite direction, it will turn one of the other stages to an "on" state. With a swing of the signal in the opposite direction, one of the two will be turned "off." The logic will keep proceeding around the ring in this manner, as shown in the logic table in FIGURE 2.

The significant thing is that the tunnel diodes in serving as bistable elements will switch between two voltage levels. Thus, when the gate input to the tunnel diode is positive and the signal input also goes positive enough, the tunnel diode will switch and go from its first to its second stable state, i.e., a forward voltage condition. Conversely, if the gate input is negative and the signal input goes negative, the tunnel diode will switch from its second stable state to its first stable state, i.e., a low voltage condition.

Although isolating diodes D1, D2, D5 and D6, D9 and D10 have been provided to achieve isolation and circuit stability, these diodes can be eliminated because it is only the resistors R2, R6 and R10 that are required to provide the high impedance to the tunnel diodes.

Although I have shown a transistor associated with each stage, such transistors are not absolutely necessary. However, inverting means of some type is required for operation of the circuitry. This inverting means can take the form of inverting means placed at the input of the tunnel diode rather than a transistor at the output.

Although I have disclosed my circuitry with bistable elements in the form of tunnel diodes, my method for counting can be used with other types of bistable elements while still utilizing the basic concept of shifting when the signal is positive above a predetermined level and shifting again when the signal is negative below a predetermined level. With my method, after the signal voltage goes in one direction above or below a predetermined voltage, another count will not be made until the signal again goes in an opposite direction beyond a predetermined voltage. Thus, with a signal such as shown in FIGURE 3, even though the signal fluctuates above and below V2, a count will not be recorded until the signal actually goes positive sufficiently so that it will be above the voltage V1.

Although I have described the operation of my counter and method with an alternating type signal, it is readily apparent that the same type of counter and method can be utilized with D.C. When such is the case, D.C. input signals would have to be above or below predetermined D.C. levels to cause shifting to occur.

I claim:

1. In a counter for counting events in an input signal in which the events are represented by changes in the input signal level above and below first and second predetermined levels, a plurality of stages, each of the stages including a bistable element capable of assuming first and second stable conditions, means for serially connecting the stages so that the output of a stage is connected to the input of the succeeding stage and so that the stages are connected into a closed series loop, means connecting the input signal to the input of each of the stages, each of said stages including gating means for supplying a signal to the succeeding stage when said bistable element is in one condition and for supplying no signal when said bistable element is in a second condition, the signal from a preceding stage serving to cause the bistable element to assume an intermediate condition, so that when said input signal changes in level beyond the first predetermined level, an additional signal passes through the bistable element to cause said bistable element to shift from its first stable state to its second stable state to cause a change in the signal supplied to the succeeding stage, so that when the signal level of the input signal shifts beyond the second predetermined level, a succeeding bistable element will be shifted from a second stable state to a first stable state.

2. A counter as in claim 1 wherein said bistable elements are tunnel diodes and wherein said gating means in each of the stages for supplying a signal to the succeeding stages includes phase inverting means.

3. In a counter for counting input events in an input signal in which the input events are represented by changes in the signal level above and below predetermined levels, a plurality of stages each capable of producing an output signal, each of the stages having a bistable element capable of assuming first and second stable states, phase inverting means connected to the bistable elements, gating means connecting the input signal and the signal from the preceding stage to the bistable element of the succeeding stage to connect the stages into a closed series loop, said gating means serving to permit the bistable element of a stage to be shifted from a first stable state to a second stable state when the preceding stage is in a predetermined condition and when the level of the input signal is beyond a first predetermined level and to be shifted from a second stable state to a first stable state when the preceding stage is in an opposite condition and when the level of the input signal is beyond a second predetermined level.

4. A counter as in claim 3 wherein the bistable elements are in the form of tunnel diodes, a power supply, means for supplying current from the power supply to the tunnel diode and wherein the gating means includes means for terminating the current flow from the power supply through the tunnel diode.

5. In a counter for counting events in an input signal in which the events are represented by changes in the signal level above and below first and second predetermined levels respectively, a plurality of stages, a power supply, each of the stages including a tunnel diode, means for supplying current from the power supply to the tunnel diode, phase inverting means connected to the tunnel diode, first gate means connecting the phase inverting means to the tunnel diode of the succeeding stage and to connect the stages into a closed series loop, and second gate means connected to the input and to the tunnel diode of each stage so that when the input signal changes in level above the first predetermined level, current flow directly from the power supply through a predetermined tunnel diode occurs and when the signal level goes below the second predetermined level, current flow in the predetermined tunnel diode is terminated.

6. In a counter for counting input events in which the input events are represented by A and B conditions, at least three serially connected bistable elements capable of assuming a plurality of stable states corresponding to a plurality of sequential codes in which the alternate codes are designated as C codes and the remaining codes are designated as D codes, a sequence of a C and a D code representing a single count of said counter and gating means connecting the input events to said bistable elements capable of assuming a plurality of stable states so that when the input events go from an A condition to a B condition, said bistable elements capable of assuming a plurality of stable states change from a C code to a D code and when the input events go from B to A conditions, said bistable elements capable of assuming a plurality of stable states change from a D code to a C code.

References Cited

UNITED STATES PATENTS

| | | | |
|---|---|---|---|
| 3,079,513 | 2/1963 | Yokelson | 307—88.5 |
| 3,102,209 | 8/1963 | Pressman | 307—88.5 |
| 3,134,031 | 5/1964 | Fennick et al. | 307—88.5 |

OTHER REFERENCES

Pulse and Digital Circuits by J. Millman and H. Taub, 1956, pages 164–168.

ARTHUR GAUSS, *Primary Examiner.*

J. ZAZWORSKY, *Assistant Examiner.*